(12) United States Patent
Beljambe et al.

(10) Patent No.: US 12,415,597 B2
(45) Date of Patent: Sep. 16, 2025

(54) PROPELLER FOR A TURBINE ENGINE OF AN AIRCRAFT WITH A VARIABLE-PITCH VANE AND A GEARED COUNTERWEIGHT DEVICE

(71) Applicant: SAFRAN AIRCRAFT ENGINES, Paris (FR)

(72) Inventors: Ceddric Beljambe, Moissy-Cramayel (FR); Clément Cottet, Moissy-Cramayel (FR); Jean Charles Olivier Roda, Moissy-Cramayel (FR); Kevin Franck Jacques Tribout, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/574,144

(22) PCT Filed: Jun. 24, 2022

(86) PCT No.: PCT/FR2022/051250
§ 371 (c)(1),
(2) Date: Dec. 26, 2023

(87) PCT Pub. No.: WO2023/275466
PCT Pub. Date: Jan. 5, 2023

(65) Prior Publication Data
US 2024/0317385 A1 Sep. 26, 2024

(30) Foreign Application Priority Data
Jun. 30, 2021 (FR) ........................................ 2107085

(51) Int. Cl.
*B64C 11/30* (2006.01)
*F01D 7/00* (2006.01)

(52) U.S. Cl.
CPC ................ *B64C 11/30* (2013.01); *F01D 7/00* (2013.01); *F05D 2260/311* (2013.01); *F05D 2260/53* (2013.01)

(58) Field of Classification Search
CPC ..... B64C 11/30; B64C 11/325; B64C 11/346; F01D 7/00; F01D 7/02; F01D 21/04; F01D 21/045; F03D 7/041; F05D 2260/311
See application file for complete search history.

(56) References Cited

U.S. PATENT DOCUMENTS 2,215,609 A * 9/1940 Sommer ................ B64C 11/346
 416/89
4,065,077 A * 12/1977 Brooks ................ B64D 27/404
 60/797

(Continued)

FOREIGN PATENT DOCUMENTS

FR 3009710 A1 2/2015
FR 3057909 A1 4/2018

(Continued)

OTHER PUBLICATIONS

International Search Report (with English translation) mailed Oct. 19, 2022, issued in corresponding International Application No. PCT/FR2022/051250, filed Jun. 24, 2022, 5 pages total.

(Continued)

*Primary Examiner* — Courtney D Heinle
*Assistant Examiner* — Cameron A Corday
(74) *Attorney, Agent, or Firm* — Christensen O'Connor Johnson Kindness PLLC (57) ABSTRACT

An assembly for a propeller of a turbine engine of an aircraft is provided. The assembly includes a variable-pitch vane having a blade connected to a root, the vane having a longitudinal axis aligned with a vane pitch axis which passes through the root, a base rigidly connected to the vane to (Continued)

rotate together with the vane about the axis and connected to a portion of a toothed wheel extending around the axis, and a counterweight device having a shaft which can rotate about an axis substantially perpendicular to the axis, the shaft being connected to at least one flyweight and to a pinion meshed with the toothed wheel portion. The toothed wheel portion can be attached to the base by at least one shear pin.

17 Claims, 7 Drawing Sheets

(56) References Cited

U.S. PATENT DOCUMENTS

| | | | | |
|---|---|---|---|---|
| 4,495,423 | A | * | 1/1985 | Rogers ............... F03D 7/0224 |
| | | | | 290/55 |
| 4,743,163 | A | * | 5/1988 | Markunas ............... F01D 7/02 |
| | | | | 416/51 |
| 5,458,465 | A | | 10/1995 | von Wieser et al. |
| 5,562,417 | A | * | 10/1996 | Grimm ............... B64D 41/007 |
| | | | | 416/152 |
| 6,474,597 | B1 | | 11/2002 | Cazenave |
| 11,384,649 | B1 | | 7/2022 | Rambo |
| 2001/0016091 | A1 | | 8/2001 | Mesing et al. |
| 2004/0081554 | A1 | | 4/2004 | Bruce |
| 2006/0248900 | A1 | | 11/2006 | Suciu et al. |
| 2006/0263220 | A1 | * | 11/2006 | Russ ............... B64C 11/303 |
| | | | | 416/147 |
| 2010/0059633 | A1 | | 3/2010 | Pohl |
| 2011/0127368 | A1 | | 6/2011 | Penda et al. |
| 2011/0288836 | A1 | | 11/2011 | Lacaille et al. |
| 2012/0224950 | A1 | | 9/2012 | Fert |
| 2015/0247546 | A1 | | 9/2015 | Nowaczyk et al. |
| 2015/0267547 | A1 | | 9/2015 | Guemmer |
| 2015/0267548 | A1 | | 9/2015 | Guemmer |
| 2016/0167798 | A1 | | 6/2016 | Prentice |
| 2016/0298457 | A1 | | 10/2016 | Edwards |
| 2017/0043878 | A1 | | 2/2017 | Pautis et al. |
| 2017/0088279 | A1 | | 3/2017 | Castelli et al. |
| 2018/0021899 | A1 | | 1/2018 | Koehne et al. |
| 2018/0105278 | A1 | | 4/2018 | El Ghannam et al. |
| 2018/0127084 | A1 | | 5/2018 | Tajan et al. |
| 2018/0335046 | A1 | * | 11/2018 | Charier ............... F01D 25/16 |
| 2020/0018181 | A1 | * | 1/2020 | Brault ............... F01D 21/045 |
| 2020/0088063 | A1 | | 3/2020 | Dyer |
| 2021/0108597 | A1 | | 4/2021 | Ostdiek et al. |
| 2021/0355870 | A1 | | 11/2021 | Lefebvre |
| 2023/0356853 | A1 | | 11/2023 | Cline et al. |

FOREIGN PATENT DOCUMENTS

| | | |
|---|---|---|
| FR | 3067075 A1 | 12/2018 |
| FR | 3 114 129 A1 | 3/2022 |

OTHER PUBLICATIONS

Written Opinion (with English translation) mailed Oct. 19, 2022, issued in corresponding International Application No. PCT/FR2022/051250, filed Jun. 24, 2022, 9 pages total.

Notice of Allowance mailed Feb. 5, 2025, issued in corresponding U.S. Appl. No. 16/563,040, filed Nov. 21, 2023, 24 pages.

* cited by examiner

PROPELLER FOR A TURBINE ENGINE OF AN AIRCRAFT WITH A VARIABLE-PITCH VANE AND A GEARED COUNTERWEIGHT DEVICE

CROSS-REFERENCE TO RELATED APPLICATIONS

This application is a National Stage of International Application No. PCT/FR2022/051250, filed Jun. 24, 2022, which claims priority to French Patent Application No. 2107085, filed Jun. 30, 2021, the entire disclosures of which are hereby incorporated by reference in their entirety for all purposes.

TECHNICAL FIELD OF THE INVENTION

The present invention relates to the field of the aircraft turbine engines and in particular to the propulsive propellers of such turbine engines, which comprise variable-pitch vanes with a geared counterweight device.

TECHNICAL BACKGROUND

The prior art comprises in particular the documents FR-A1-3 009 710 and FR-A1-3 057 909.

An aircraft turbine engine propeller can be shrouded (FIG. 1), as in the case of a fan for example, or unshrouded (FIG. 2), as in the case of an open-rotor architecture for example.

A propeller comprises vanes which may be pitch variable. The turbine engine then comprises a mechanism allowing to modify the angle of pitch of the vanes in order to adapt the thrust generated by the propeller to different phases of flight. The angular pitch setting of the propeller vanes also allows to optimise the efficiency of the propeller as a function of the speed of the aircraft and to optimise the pumping margin of the turbine engine to reduce its fuel consumption in the different phases of flight.

As a reminder, the pitch angle of a propeller vane corresponds to the angle, in a longitudinal plane perpendicular to the axis of rotation of the propeller vane, between the vane chord and the plane of rotation of the fan or of the engine of the turbine engine.

The variable pitch propeller vanes can occupy a reverse thrust position in which they generate counter-thrust to help slow down the aircraft, and a feathered position in which, in the event of failure or breakdown, they allow to limit their aerodynamic resistance and/or drag. The consequences of this drag could be in terms of flight safety in the event of loss of control of the aircraft if its vertical stabilizer is not dimensioned for this, and could be in terms of performance for the possible duration of the single-engine diversion flight.

Numerous devices have been imagined to vary the pitch of the propeller vanes, which generally comprise a rotation of the vane about its main axis (corresponding to a pitch axis of the vane) by means of a control system located radially inside the roots of the vanes. This control system comprises, for example, an actuator which may be connected to the roots of the vanes by connecting rods and/or a linkage.

One of the stresses of the control system for controlling the pitch setting of the propeller vanes is to bring the vanes into the predetermined position, referred to as the "feathered position", in the event of a failure of this pitch setting system. The feathering allows to minimise the aerodynamic drag.

Figure 3:
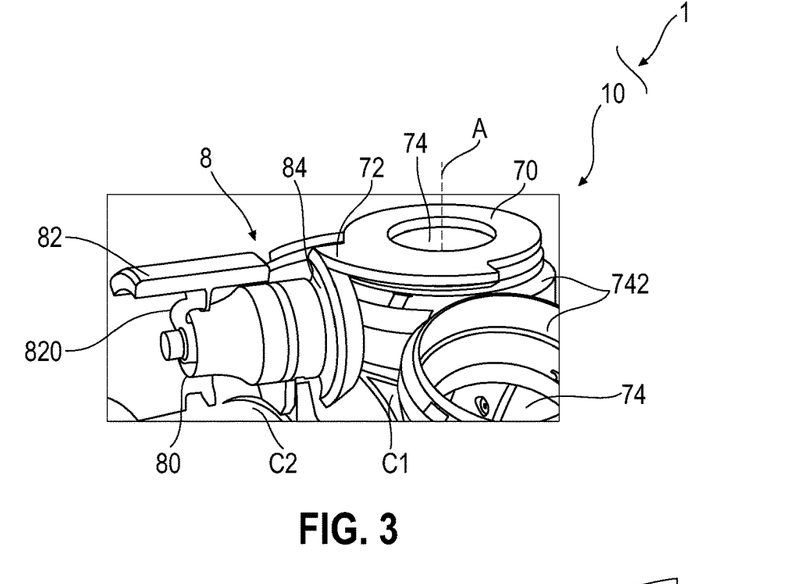
FIG. 3 is a schematic perspective view of an assembly comprising a counterweight device and a base of a propeller vane of FIG. 1 or FIG. 2.
Figure 4:
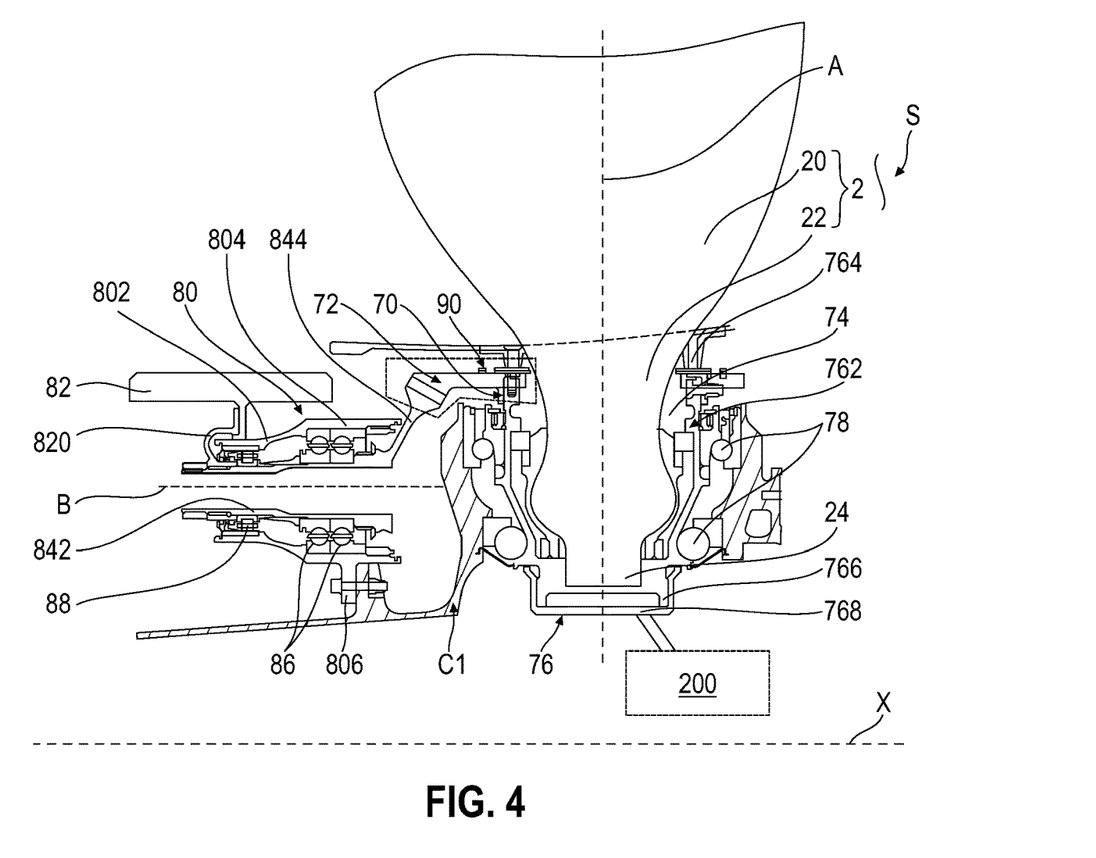
FIG. 4 is a schematic longitudinal cross-section of the assembly shown in FIG. 3.

Traditionally, the feathering is achieved by direct counterweight devices whose inertia, which is much greater than that of the propeller vanes, must ensure that the return of the latter to the pre-defined feathered position. A counterweight device is generally associated with each of the vanes. The counterweight device may comprise a shaft movable in rotation, for example, about an axis perpendicular to the pitch axis of the vane. Depending on the type of gearing used in the counterweight device, the gearing may be perpendicular and/or concurrent with the pitch axis of the vane. Conventionally, the conical pinion gearing of the counterweight device extends along an axis that at least coincides with the pitch axis of the vane. The movable shaft of the counterweight device is connected to a weight and therefore to a conical pinion, which is meshed with a portion of the toothed wheel that is secured in rotation with the vane (FIG. 3). The shaft is generally centred and guided in rotation by at least one bearing, for example a ball bearing (FIG. 4).

However, a seizure of the conical pinion or of one of the bearings of the counterweight device can cause the blocking of the kinematics of the counterweight device. To avoid blocking the assembly of the vane pitch setting mechanism, it may be necessary to add a section referedded to as a shear section. This shear section can be associated with the control system. By way of example, the shear section can be on one of the connecting rods for connecting to the actuator or on the rod for connecting to the actuator. However, this solution has the disadvantage of losing the actuation of one of the vanes, which remains blocked in its current operating position. This blockage can cause a mechanical and aerodynamic imbalance, and can lead to an active feathering and in-flight incidents such as an IFSD (In Flight Shut Down). This can generally limit the operability and the performances of the turbine engine and of the aircraft.

In this context, it is interesting to overcome the disadvantages of the prior art, by integrating a simple and effective safety function on a variable vane and its counterweight device.

SUMMARY OF THE INVENTION

The present invention provides a simple, effective and economical solution to at least some of the above problems.

To this end, the invention relates to an assembly for an aircraft turbine engine propeller, the assembly comprising:
- a variable pitch vane comprising a blade connected to a root, the vane comprising a longitudinal axis coincident with a pitch axis A of the vane which passes through said root,
- a base secured in rotation to the vane about the pitch axis A and connected to a toothed wheel portion extending about this pitch axis A, and
- a counterweight device comprising a shaft movable in rotation about a substantially concurrent axis B perpendicular to said pitch axis A, this shaft being connected to at least one weight and to a pinion portion geared with the toothed wheel portion.

According to the invention, the toothed wheel portion is attached to said base by at least one shear bolt.

The axis B may be substantially perpendicular to and/or concurrent with the pitch axis A.

The incorporation of at least one shear bolt allows the toothed wheel portion to become disengaged from the base, which is secured in rotation to the variable pitch vane in the event of failure of the counterweight device. More specifically, when the kinematic of the counterweight device is blocked (such as by a seizure of the conical pinion or the bearings), a significant force is applied to the portion of the toothed wheel geared by means of the pinion of the counterweight device, so that the shear bolt breaks. By way of example, the shear bolt is dimensioned to break as a result of shear and/or tensile overstress exerted by the pinion of the blocked counterweight device. The breaking and the disengagement of the toothed wheel portion of the base allows to free the pitch actuation kinematic of the assembly of the vanes, so that the assembly of the pitch change mechanism is not blocked. This allows to prevent a mechanical and aerodynamic imbalance on the vane due to the blocked counterweight device. As a result, the variable pitch vane and its base are effectively protected in the event of failure of the associated counterweight device.

The assembly according to the invention may comprise one or more of the following characteristics, taken alone from each other, or in combination with each other:
- the toothed wheel portion is attached to said base by several shear bolts;
- the or each shear bolt extends along a first axis of elongation Y which is parallel to said pitch axis A;
- the or each shear bolt comprises a first head bearing on said toothed wheel portion, and a first body which passes through first orifices in this portion and in the base;
- said first body comprises a first segment threaded and screwed into the first orifice of the base, which is tapped, and a second segment defining a smaller section of the first body;
- the second segment comprises an annular groove;
- said annular groove has a second or third diameter D2, D3 smaller than a first diameter of the first body and a variable first or second thickness, the diameters D1 to D3 being measured with respect to an axis perpendicular to the axis Y and the thicknesses E1, E2 being measured with respect to the axis Y;
- the second segment comprises at least one hole;
- the assembly further comprises at least one retention screw for retaining the toothed wheel portion on the base, the or each retention screw being non-functional as long as the at least one shear bolt is unbroken and the or each retention screw being functional when said at least one shear bolt is broken,
- the or each retention screw comprises a second head which is configured, on the one hand, to be at a distance from the toothed wheel portion when said at least one shear bolt is not broken, and on the other hand, to be capable of coming to bear on and retaining the toothed wheel portion when said at least one shear bolt is broken;
- the or each retention screw extends along a second axis of elongation Z which is parallel to said pitch axis A;
- the or each retention screw comprises a second body which passes through second orifices in the toothed wheel portion and in the base;
- said second body comprises a third segment threaded and screwed into the second orifice of the base, which is tapped, and a fourth non-threaded segment engaged in the second orifice of the toothed wheel portion;
- the shear bolts are staggered with the retention screws.

The present invention also relates to a propeller for a turbine engine, in particular of an aircraft, comprising several assemblies as described above.

The propeller can be either a shrouded propeller or an unshrouded propeller.

The present invention also relates to a turbine engine, in particular for an aircraft, comprising at least one propeller or several assemblies as described above.

The turbine engine may be a turbojet or a turboprop.

BRIEF DESCRIPTION OF THE FIGURES

Further characteristics and advantages will be apparent from the following description of a non-limiting embodiment of the invention with reference to the appended drawings in which.

DETAILED DESCRIPTION OF THE INVENTION

By convention in the present application, the terms "inside" and "outside", and "internal" and "external" are defined radially with respect to a longitudinal axis (which may correspond to a longitudinal axis X of a turbine engine). A cylinder extending along this longitudinal axis therefore comprises an inner face facing the axle of the engine and an outer surface opposite its inner surface. "Axial" or "axially" means any direction parallel to this longitudinal axis, and "transversely" or "transversal" means any direction perpendicular to this longitudinal axis. Similarly, the terms "upstream" and "downstream" are defined in relation to the direction of air flow in the turbine engine, which is represented by an arrow F.

Conventionally, a turbine engine 1 (FIG. 1 or 2) comprises a gas generator G (or engine) upstream of which is mounted a fan module S. The turbine engine 1 extends along a longitudinal axis X.

Figure 1:
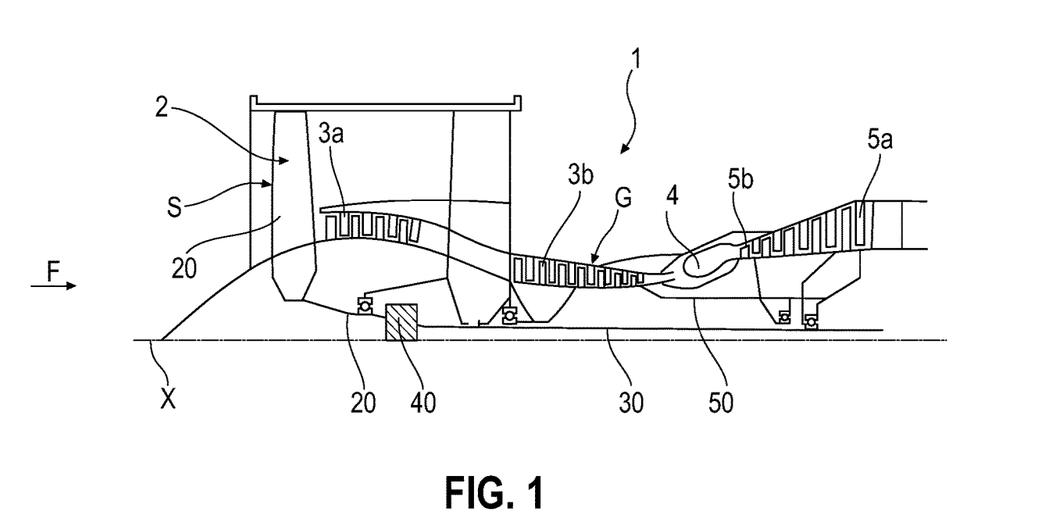
FIG. 1 is a partial schematic view in longitudinal cross-section of an aircraft turbine engine comprising a shrouded propeller.
Figure 2:
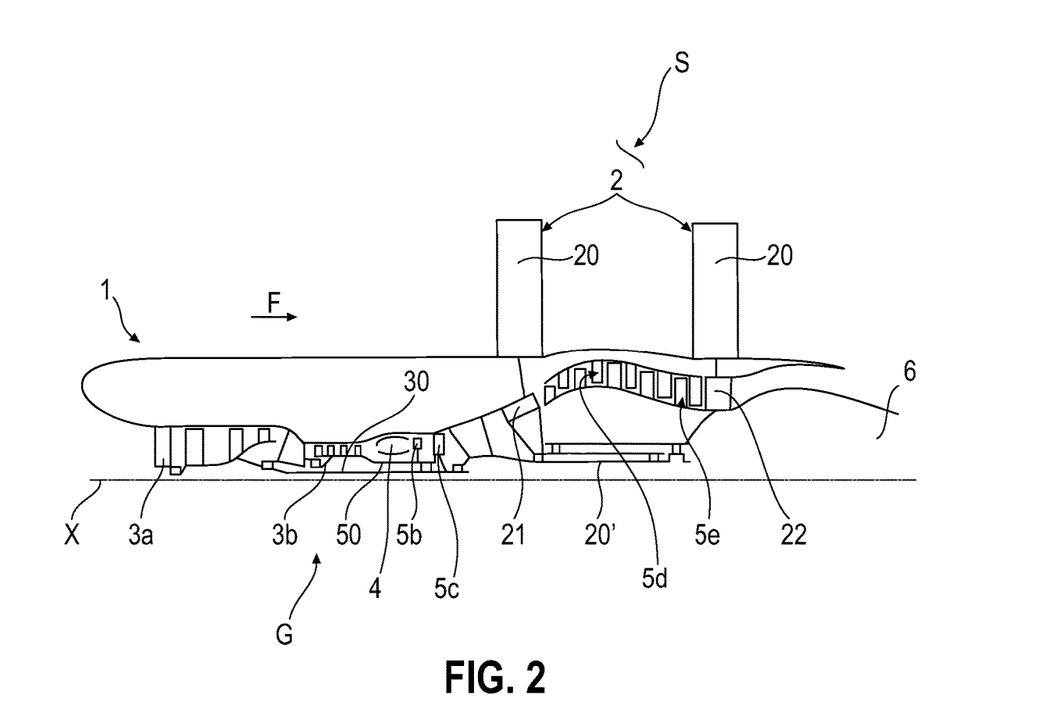
FIG. 2 is a partial schematic view in longitudinal cross-section of an aircraft turbine engine comprising two unshrouded propellers.

In general, and for the remainder of the description, the term "fan module" is used to refer either to a fan or a propeller, and the vanes of the fan or of the propeller may be shrouded (for example, in the turbofan engines shown in FIG. 1) or unshrouded (for example, in the turboprop engines shown in FIG. 2).

FIGS. 1 and 2 illustrate two types of turbine engine 1, each intended to be mounted on an aircraft.

More specifically, FIG. 1 schematically illustrates a double flow turbine engine 1 comprising a module of fan S with a shrouded propulsive propeller. The gas generator G of the turbine engine 1 comprises, from upstream to downstream, a low-pressure compressor 3a, a high-pressure compressor 3b, an annular combustion chamber 4, a high-pressure turbine 5b, a low-pressure turbine 5a and an exhaust nozzle 6.

FIG. 2 provides a schematic illustration of an open-rotor turbine engine 1 comprising a fan module S with unshrouded propulsive propellers. In the example shown in FIG. 2, the fan module S is downstream of the gas generator G. Alternatively (not illustrated), the fan module S with doublet propeller can be upstream of the gas generator G of the turbine engine. The gas generator G of the turbine engine 1 comprises, from upstream to downstream, a low-pressure compressor 3a, a high-pressure compressor 3b, an annular combustion chamber 4, a high-pressure turbine 5b, an intermediate-pressure turbine 5c, first and second free power turbines 5d, 5e and an exhaust nozzle 6.

The first and second free turbines 5d, 5e form a doublet of counter-rotating turbines to drive the unshrouded propellers S in counter-rotation. First and second rotating structural devices 21, 22 are located axially between the first and second free turbines 5d, 5e. Each rotating structural device 21, 22 is connected to one of the propellers S and to a stationary shaft 20'. This stationary shaft 20' is centred on the axis X and forms a stationary casing for the free turbines 5d, 5e. In the example shown in FIGS. 1 and 2, the high-pressure compressor 3b and the high-pressure turbine 5b are connected by a high-pressure shaft 50 and together form a high-pressure (HP) body. The low-pressure compressor 3a and the low-pressure turbine 5a or the intermediate-pressure turbine 5c are connected by a low-pressure shaft 30 and together form a low-pressure (LP) body.

In FIG. 1, the fan S is driven by a fan shaft 20 which is coupled to the LP shaft 30 by means of a speed reducer 40. Whereas in FIG. 2, gases from the primary duct escaping from the intermediate turbine 5c rotate the free turbines 5d, 5e, the rotating structural devices 21, 22 and therefore the propellers S.

The invention is generally applicable to a propeller or a fan S which is either shrouded (FIG. 1) or unshrouded (FIG. 2).

The propeller or the fan S comprises a plurality of variable pitch vanes 2. Each vane 2 comprises a blade 20 connected to a root 22 (FIG. 4). The blade 20 has an aerodynamic profile and comprises an intrados and an extrados which are connected by an upstream leading edge and a downstream trailing edge (not shown). The blade 20 has an upper end which is free, referred to as summit, and a lower end which is connected to the root 22.

The root 22 defines a pitch axis A which corresponds substantially to a longitudinal axis of the vane 2 and of the blade 20. The pitch axis A is an axis about which the angular position of the vane 2 is adjusted. This axis A is also generally a radial axis (substantially perpendicular to the axis X) which therefore extends along a radius in relation to the axis of rotation of the propeller S equipped with this vane 2.

The angular position of each of the blades 20 about their axis A can be ensured by a control system 200 for controlling the propeller S. The control system 200 may comprise a single actuator for all the vanes 2 of the propeller. By way of example, this actuator (not shown) can be connected to connecting rods at the roots 22 or to a rod which acts on pinions attached to the vanes 2, in particular by surrounding the roots 22. The propeller S also comprises a polygonal annulus C1 to support the blades 20, this annulus C1 forming a propeller hub (FIGS. 3 and 4). The polygonal annulus C1 can be connected to a casing C2 or a stationary structure of the turbine engine 1. The annulus C1 comprises a plurality of housings 74 spaced circumferentially from one another, these housings 74 being radial housings (with respect to the axis X). Each of the housings 74 extends around the axis A and is configured to receive a support 76 for the root 22 of vane.

In FIG. 4, the support 76 comprises an annular wall 762. This annular wall 762 comprises a lower end 766 closed by a bottom wall 768, and an upper axial end 764 which is open and configured to allow the root 22 of the vane 2 to be mounted inside the housing 74. The bottom wall 768 is configured to cooperate in a form-fitting manner with a free end 24 of the root 22, so that the housing 74 is secured in rotation with the root 22 about the axis A.

First bearings 78 are interposed between each housing 74 and the annular wall 762 of the support 76 of the vane root, in particular to ensure the centring and the guiding of the support 76 about the axis A with respect to the polygonal annulus C1 and/or a stationary structure of the turbine engine 1.

With reference to FIGS. 3 and 4, the propeller S comprises several assemblies 10. In the present application, an assembly 10 is taken to mean some of the elements making up the propeller S. Thus, an assembly 10 comprises a variable-pitch vane 2, a base 70 and a counterweight device 8 associated with the vane 2.

The base 70 of each assembly 10 is configured to be secured in rotation with the vane 2 about the axis A. In the example shown in FIG. 4, the base 70 is mounted on the annular wall 762 of each support 76 and above each housing 74.

Figure 6:
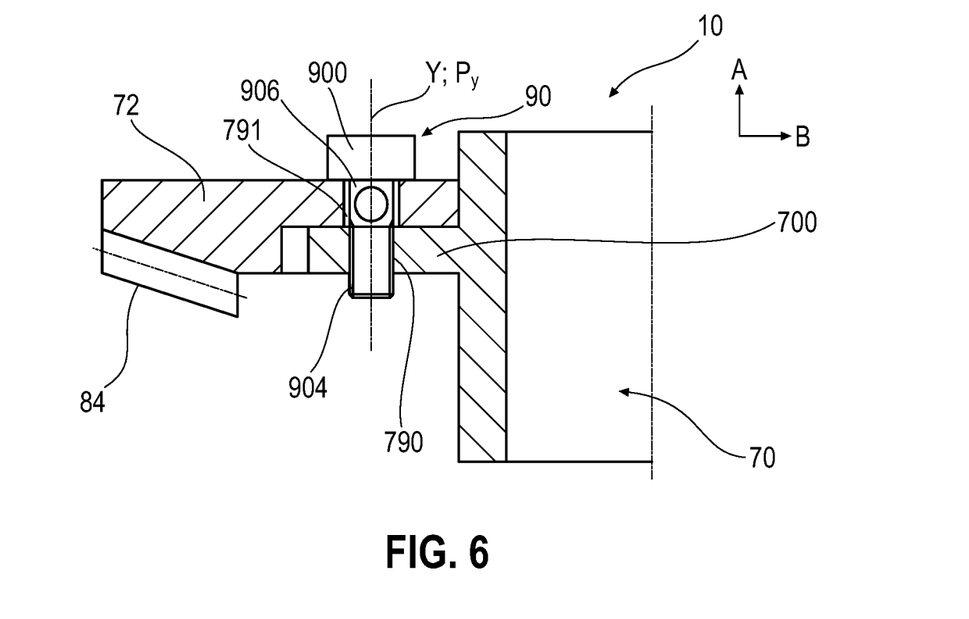
FIG. 6 is an enlarged and partial schematic view in longitudinal cross-section of the shear bolt assembled in the assembly of FIG. 4 according to a first embodiment of the invention.
Figure 8:
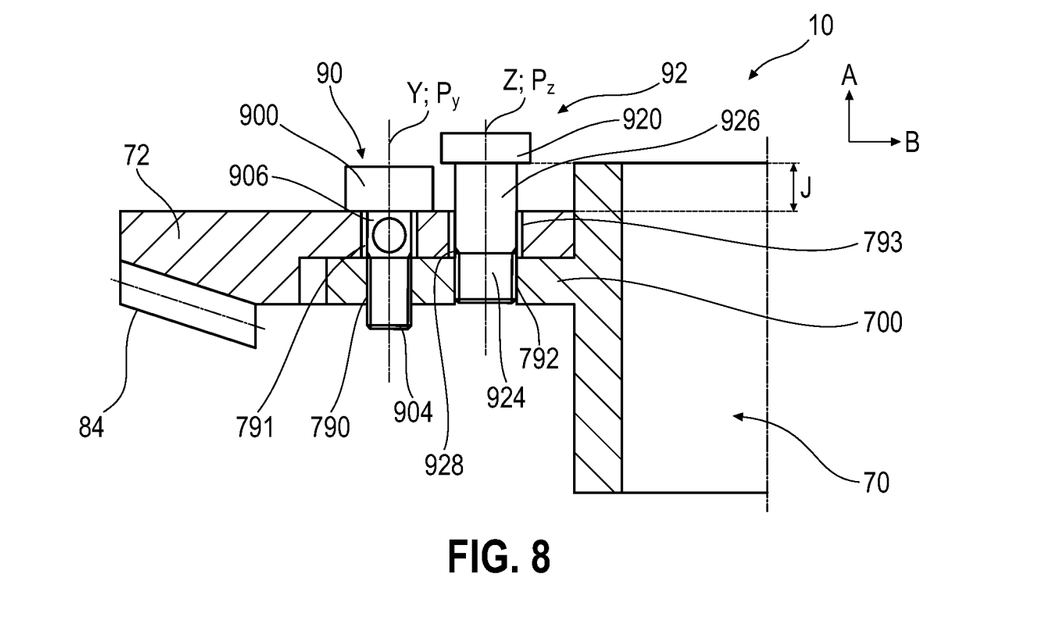
FIG. 8 is an enlarged and partial schematic view in longitudinal cross-section of the shear bolt and of the retention screw assembled in the assembly shown in FIG. 4 according to a second embodiment of the invention.
Figure 9:
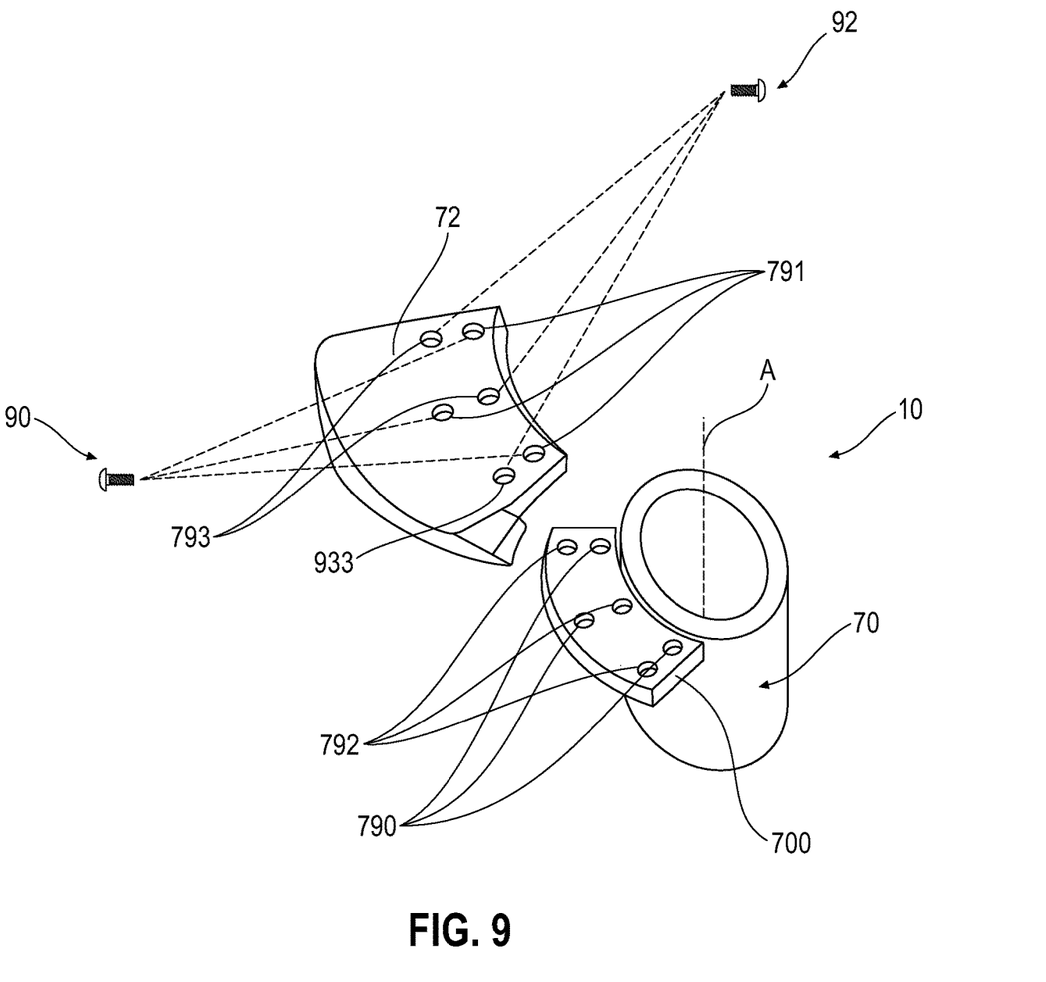
FIG. 9 is a partial schematic perspective view of the assembly shown in FIG. 8.

In the example shown in FIGS. 6, 8 and 9, the base 70 comprises an extension 700 which extends substantially perpendicular to the axis A. This extension 700 is a radial extension (relative to the axis A) of the body of the base 70. The extension 700 comprises at least one first orifice 790 passing through a first plane $P_Y$ (FIGS. 6 and 8). The extension 700 may also comprise at least one second orifice 792 passing through a second plane $P_Z$ (FIG. 8). The first and second planes $P_Y$, $P_Z$ are substantially parallel to the axis A. The first plane $P_Y$ may be upstream of the second plane $P_Z$ and/or vice versa.

The base 70 is connected to a toothed wheel portion 72 which also extends around the axis A. In the example shown in FIG. 3, this portion 72 may be an angular sector extending circumferentially around the axis A. The angular sector of the portion 72 may be between 30° and 150°, preferably between 90° and 130°. The angular sector of the portion 72 can vary according to the pitch range of the pitch axis of the vane, depending on a shrouded propeller or on an unshrouded propeller. The toothed wheel portion 72 may comprise toothings configured to gear with toothings of the counterweight device 8. This portion 72 may therefore be conical.

In the example shown in FIGS. 6, 8 and 9, the portion 72 comprises at least one first orifice 791 passing through the first plane $P_Y$. The portion 72 may also comprise at least one second orifice 793 passing through the second plane $P_Z$. In the examples, the first orifices 790, 791 of the base 70 and of the portion 72 are aligned with respect to the first plane $P_Y$ and the second orifices 792, 793 are aligned with respect to the second plane $P_Z$.

The counterweight device 8 of each assembly 10 comprises a shaft 80 connected to at least one weight 82 and to a pinion portion 84.

The pinion portion 84 (or pinion 84) can be conical in shape. In the example shown in FIG. 4, the pinion portion 84 comprises a cylindrical upstream segment 842 and a downstream segment 844 flared towards the base 70. The upstream segment 842 therefore has a smaller diameter than the downstream segment 844. The pinion portion 84, and in particular the downstream segment 844, may comprise toothing suitable for gearing with the toothings of the toothed wheel portion 72, in particular conical. For example, the assembly 10 may comprise a toothed pinion portion 72 on the support 76 of the vane root and a toothed pinion portion 84 on the shaft 80 of the counterweight device. The proportion of the pinion portions can be equal to the reduction ratio (or transmission ratio) between the rotational speeds of the shaft of the counterweight device and of the vane.

The shaft 80 is movable in rotation about an axis B which is substantially perpendicular to the axis A (and substantially parallel to the axis X). In the example shown in FIG. 4, the shaft 80 is a hollow cylindrical part. The shaft 80 comprises a first cylindrical portion 802 and a second cylindrical portion 804. The upstream segment 842 of the pinion portion 84 extends inside the first and second portions 802, 804. Second bearings 86 are interposed between the second portion 804 of the shaft 80 and the upstream segment 842 of the pinion portion 84. A third bearing 88 is interposed between the first portion 802 of the shaft 80 and the upstream segment 842 of the pinion 84. The second and third bearings 86, 88 are arranged around the upstream segment 842 of the portion of the pinion 84. The second bearings 86 and/or the third bearing 88 can be of the ball bearing type (FIG. 4), needle rollings or other bearing technology. The needle rolling bearings are smaller and lighter in relation to the stresses on the shaft of the counterweight device. These bearings 86, 88 allow the shaft 80 and the pinion portion 84 to be centred and guided about the axis B with respect to the polygonal annulus C1. The shaft 80 can be flanged to the annulus C1 by a flange 806 which extends radially inwards from the axis X.

In the example shown in FIGS. 3 and 4, the weight 82 is connected to the shaft 80 and to the pinion 84 by a clip 820. The weight 82 extends radially outwards from the axis B.

Figure 5A:
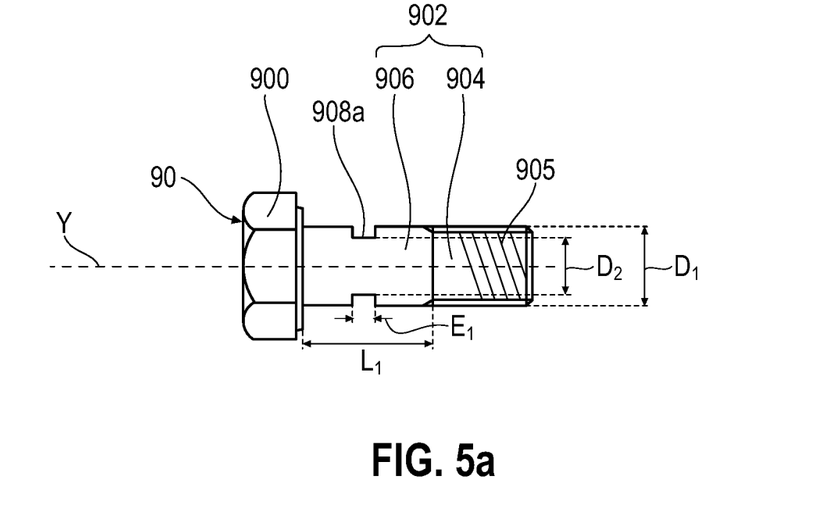
FIG. 5a is a schematic perspective view of a shear bolt according to a first embodiment of the invention.
Figure 5B:
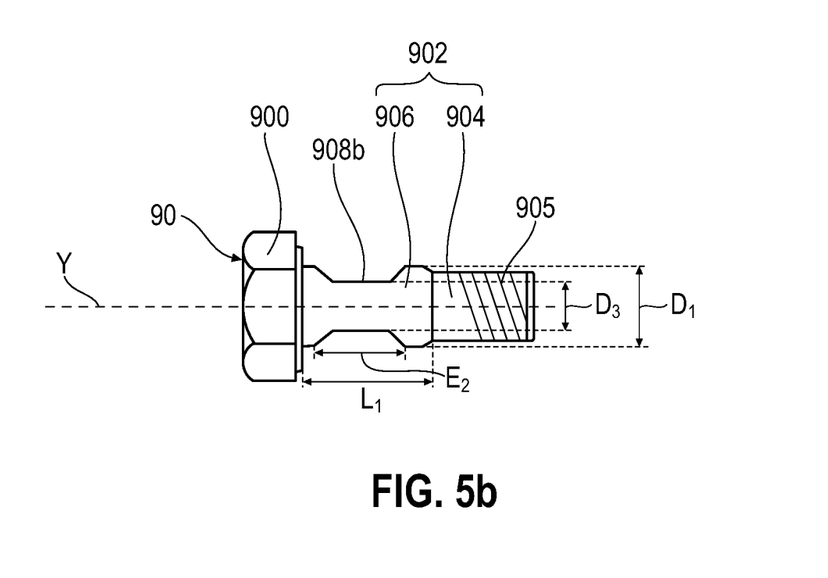
FIG. 5b is a schematic perspective view of a shear bolt according to a second embodiment of the invention.
Figure 5C:
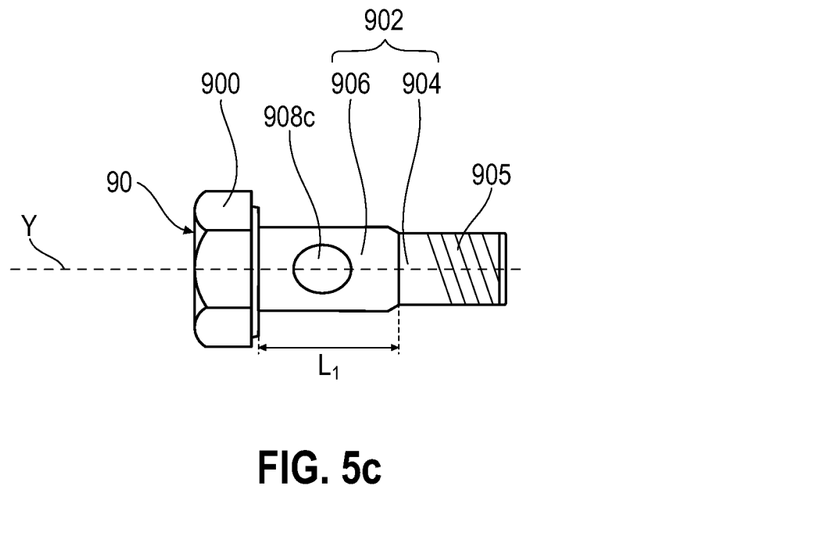
FIG. 5c is a schematic perspective view of a shear bolt according to a third embodiment of the invention.

One of the particularities of the invention is that the toothed wheel portion 72 is attached to the base 70 by at least one or more shear bolts 90. FIGS. 5a to 5c illustrate several different embodiments of the shear bolt 90.

FIG. 5a shows a first embodiment of the shear bolt 90. The shear bolt 90 is a cylindrical revolution part extending around a first axis of elongation Y. This axis Y corresponds to a screwing axis of the shear bolt 90. This axis Y is substantially parallel to the axis A. The shear bolt 90 comprises a first head 900 and a first body 902. The first body 902 is cylindrical in shape and has a first external diameter D1. The external diameter D1 is measured with respect to a radial axis perpendicular to the axis Y. The body 902 comprises a first segment 904 and a second segment 906 (also referred to as the "barrel"). The first segment 904 may comprise a thread 905. The second segment 906 may have a first length L1 measured with respect to the axis Y. The second segment 906 is therefore configured to form a preferred shear and/or tensile fracture area. In particular, the second segment 906 may have a smaller section than the first body 902. To achieve this, the second segment 906 may comprise an annular groove 908a. This annular groove 908a has a second external diameter D2 smaller than D1. The annular groove 908a has a first thickness E1 measured with respect to the axis Y.

FIG. 5b illustrates a second embodiment of the shear bolt 90. This shear bolt 90 in FIG. 5b differs from that in FIG. 5a in the second segment 906. The second segment 906 of the second embodiment also comprises a deep annular groove 908b. This annular groove 908b has a third external diameter D3 smaller than D2. The annular groove 908b has a second thickness E2 greater than E1.

FIG. 5b illustrates a third embodiment of the shear bolt 90. This shear bolt 90 in FIG. 5c also differs from that in FIGS. 5a and 5b in the second segment 906. The second segment 906 of the third embodiment comprises at least one hole 908c of variable size.

The present application now describes the shear bolt 90 mounted in the assembly 10 of the invention with reference to FIG. 6. Alternatively, several shear bolts 90 can connect the base 70 and the toothed wheel portion 72. For example, there may be between two and ten shear bolts 90. Preferably, the portion 72 and the base 70 are connected by approximately two or three shear bolts 90 (FIG. 9).

More particularly, the shear bolt or bolts 90 are screwed into the first orifices 790, 791 of the base 70 and the toothed wheel portion 72. The axis Y of each shear bolt 90 therefore coincides with the first plane $P_Y$ of each of the first orifices 790, 791.

Figure 10:
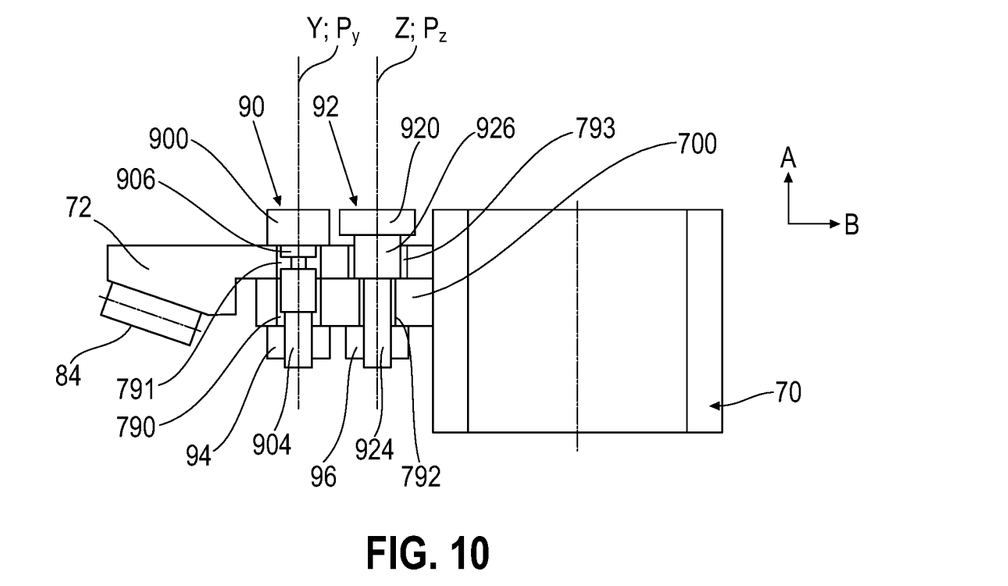
FIG. 10 is an enlarged and partial schematic view in longitudinal cross-section of the shear bolt and of the retention screw assembled in the assembly according to a third embodiment of the invention.
Figure 11:
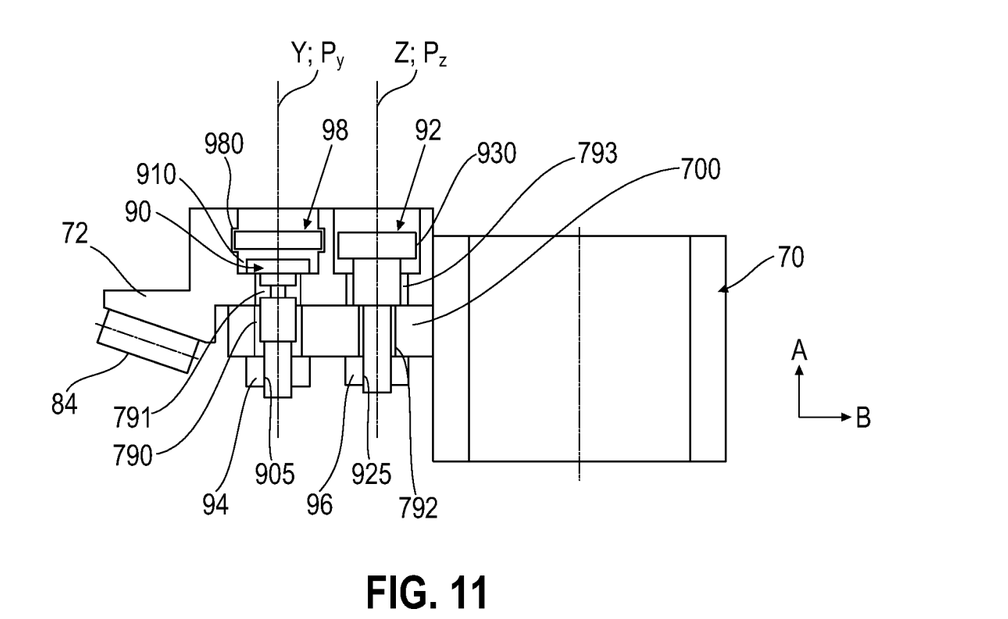
FIG. 11 is an enlarged schematic view of the shear bolt and of the retention screw assembled in the assembly according to a fourth embodiment of the invention.

The first head 900 of the shear bolt 90 rests on the toothed wheel portion 72. The first body 902 passes through the first orifices 790, 791. More particularly, the second segment 906 is mounted in the first orifice 791 of the toothed wheel portion 72, and the first segment 904 is mounted in the first orifice 790 of the base 70, in particular of the extension 700. By way of example, the first threaded segment 904 is screwed in a complementary manner to the tapping of the first orifice 790 in the base 7. Alternatively, as shown in FIGS. 10 and 11, the first segment 904 is mounted in the first orifice 790 and a first tightening nut 94 can be screwed onto the thread 905 of the first segment 904 to lock the assembly.

In this configuration shown in FIG. 6, the first head 900 is in direct contact with the toothed wheel portion 72, the second segment 906 (with the fusible section) is also assembled in the portion 72 and the first segment 904 is mechanically linked to the base 7. If at least one of the elements of the counterweight device 8 blocks, the portion 72 geared by the pinion portion 84 of the counterweight device 8 transmits a torque (or a stress) greater than the tightening torque of the shear bolt 90. In particular, the contact adhesion between the first head 900 and the portion 70 causes the fusible section of the second segment 906 to break when torque is transmitted from the portion 72 to the shear bolt 90. This allows the base 70 to be disengaged from the locked toothed wheel portion 72 and the counterweight device 8. This also prevents the base 70, which is secured in rotation to the vane 2, and the assembly of the pitch change mechanism for changing the pitch of the vane 2 from being blocked.

Another particularities of the invention lies in the fact that, in addition to at least one shear bolt 90, the base 70 and the toothed wheel portion 72 are attached by at least one retention screw 92 (or attachment or retaining screw).

Figure 7:
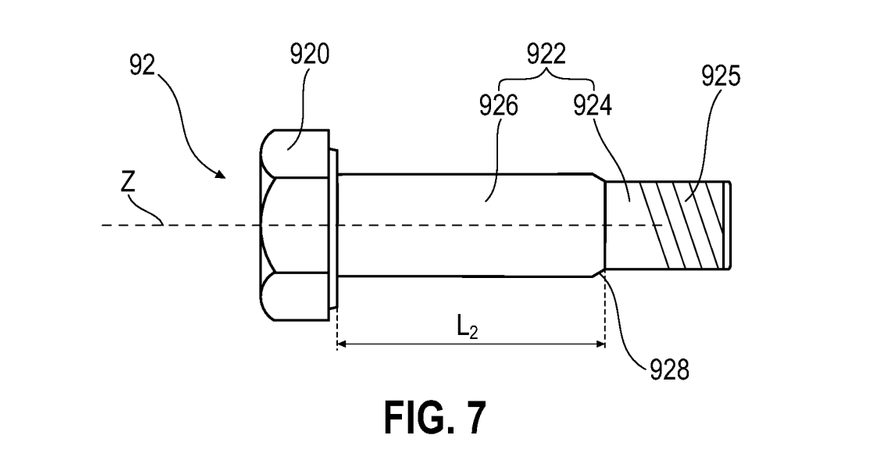
FIG. 7 is a schematic perspective view of a retention screw according to the invention.

With reference to FIG. 7, the retention screw 92 is also a cylindrical revolution part extending around a second axis of elongation Z. This axis Z corresponds to the screwing axis for screwing the retention screw 92. This axis Z is substantially parallel to the axes A and Y. The retention screw 92 comprises a second head 920 and a second cylindrical body 922. The second body 922 comprises a third segment 924 and a fourth segment 926 (also referred to as the "barrel"). The third segment 924 may comprise a second thread 925. The fourth segment 926 may comprise an annular shoulder 928. This shoulder 928 is located opposite the second head 920 and connected to the third segment 924. The fourth segment 926 may have a second length L2 measured with respect to the axis Z. Preferably, the second length L2 is greater than the first length L1. The second head 920 is configured to form a preferred area for holding the toothed wheel portion 72 in the event of the counterweight device 8 blocking and the portion 72 becoming disengaged from the base 70.

In addition, the second head 920 of the retention screw 92 can be offset relative to the portion 72 to ensure that the nominal forces pass through the shear bolts 90 and that, in the event of seizure, it is the shear bolts 90 that break. Finally, to ensure during assembly that the second retention screw head is not brought into contact with the portion 72, it is possible to fit either a shoulder 928 on the screw 92, or to go to the bottom of the tapping of the base 70.

The present application now describes the retention screw 92 mounted in the assembly 10 of the invention with reference to FIGS. 8 and 9. Alternatively, several retention screws 92 can connect the extension 700 of the base 70 and the toothed wheel portion 72. Preferably, the assembly 10 comprises the same number of shear bolts 90 and retention screws 92. For example, there may be between two and ten retention screws 92. FIG. 9 shows the portion 72 and the base 70 connected by three retention screws 92 and three shear bolts 90.

More specifically, the retention screw or screws 92 are screwed into the second orifices 792, 793 of the base 70 and into the toothed wheel portion 72. The axis Z of each shear bolt 90 is therefore coincident with the second plane $P_Z$ of each of the second orifices 792, 793.

The second head 900 of the shear bolt 90 is at a distance from the toothed wheel portion 72. Each retention screw 92 is mounted in the second orifices 792, 793 with a minimum clearance J between the second head 900 and the toothed wheel portion 72. By way of example, the clearance J is between 1 and 5 mm. Preferably, the clearance J is about 2 mm. This clearance J may be a compromise between having a minimum of unbalance so that it is detectable, and a maximum to avoid damaging the turbine engine. In this way, the clearance J can depend on the speed of rotation and on the radial position of the counterweight device. The second body 922 passes through the second orifices 792, 793. More particularly, the fourth segment 926 is mounted in the second orifice 793 of the toothed wheel portion 72, and the third segment 924 is mounted in the second orifice 792 of the base 70. By way of example, the third threaded segment 924 is screwed in a complementary manner to the tapping of the second orifice 792 in the base 70. Alternatively, as shown in FIGS. 10 and 11, the third segment 924 is mounted in the second orifice 792 and a second tightening nut 96 can be screwed onto the thread 925 of the third segment 924 to lock the assembly.

With reference to FIG. 9, the shear bolts 90 are staggered in relation to the retention screw 92. This allows to form a polygon of sustentation sufficient to ensure a balance of loads in the screws 90, 92 and to obtain a reduced overall dimension.

In this configuration of FIG. 8 or FIG. 9, the second head 920 is not in direct contact with the toothed wheel portion 72, the fourth segment 926 is mounted in the portion 72 with the annular shoulder 928 bearing on the base 70 and the third segment 924 is mechanically linked to the base 70. When the shear bolt or bolts 90 are unbroken and intact (in particular in normal operation without blocking the counterweight device 8), the second head 920 is at a distance from the toothed wheel portion 72. When the shear bolt or bolts 90 are broken (in particular if at least one of the elements of the counterweight device 9 is blocked), the portion 72 becomes disengaged from the base 70. The disengaged portion 72 comes into abutment against the second head 920. The second head 920 is therefore able to retain the disengaged portion 72. This prevents the disengaged portion 72 (considered as a debris) from being released and projected into the turbine engine during operation.

FIGS. 10 and 11 illustrate two other variants of embodiment of the assembly 10 shown in FIG. 8.

The assembly 10 in FIG. 10 differs from the assembly 10 in FIG. 8 by the use of the first 94 and second 96 nuts for tightening, respectively, the first segment 904 of the shear bolt 90 and the third segment 924 of the retention screw 92. In the example shown in FIG. 10, the threads 905, 925 of the first 904 and third 924 segments and the first 94 and second 96 nuts are arranged outside the base 70.

With reference to FIG. 11, the toothed wheel portion 72 of the assembly 10 may further comprise first 910 and second 930 counterbores. The first counterbore or counterbores 910 are configured to receive the first head 900 of the shear bolt 90. The second counterbore or counterbores 930 are configured to receive the second head 920 of the retention screws 92. In the example shown in FIG. 11, the first counterbore or counterbores 910 comprise an annular gorge 980 (relative to the axis Y). The annular gorge 980 is preferably located above and at a distance from the first head 900 of screw 90. This gorge 980 may comprise a circlip (or elastic annulus), so as to prevent the first head 900 of shear bolt 90, once it has been disengaged from the base 70, from being projected out of the assembly 10 into the compartment of the turbine engine.

The invention claimed is:

1. An assembly for a propeller of a turbine engine of an aircraft, the assembly comprising:
    a variable-pitch vane having a blade connected to a root, the vane having a longitudinal axis coincident with a pitch axis of the vane which passes through the root;
    a base secured in rotation to the vane about the pitch axis and connected to a toothed wheel portion extending about the pitch axis; and
    a counterweight device having a shaft movable in rotation about a substantially concurrent axis perpendicular to the pitch axis, the shaft being connected to at least one weight and to a pinion portion geared with the toothed wheel portion,
    wherein the toothed wheel portion is attached to the base by at least one shear bolt.

2. The assembly according to claim 1, wherein the toothed wheel portion is attached to the base by a plurality of shear bolts.

3. The assembly according to claim 1, wherein the at least one shear bolt extends along a first axis of elongation which is parallel to the pitch axis.

4. The assembly according to claim 1, wherein the at least one shear bolt comprises:
   a first head bearing on the toothed wheel portion; and
   a first body which passes through first orifices of the toothed wheel portion and first orifices of the base.

5. The assembly according to claim 4, wherein the first body comprises:
   a first segment threaded and screwed into the first orifice of the base, which is tapped; and
   a second segment defining a smaller section of the first body.

6. The assembly according to claim 5, wherein the second segment comprises an annular groove.

7. The assembly according to claim 5, wherein the second segment comprises at least one hole.

8. The assembly according to claim 1, further comprising at least one retention screw for retaining the toothed wheel portion on the base, the at least one retention screw being non-functional as long as the at least one shear bolt is unbroken and the at least one retention screw being functional when the at least one shear bolt is broken.

9. The assembly according to claim 8, wherein the at least one retention screw has a second head which is configured, on the one hand, to be at a distance from the toothed wheel portion when the at least one shear bolt is not broken, and, on the other hand, to be able to come to bear on and retain the toothed wheel portion when the at least one shear bolt is broken.

10. The assembly according to claim 8, the at least one retention screw extends along a second axis of elongation which is parallel to the pitch axis.

11. The assembly according to claim 8, wherein the at least one retention screw has a second body which passes through the second orifices in the toothed wheel portion and in the base.

12. The assembly according to claim 11, wherein the second body comprises:
   a third segment threaded and screwed into the second orifice of the base, which is tapped; and
   a fourth non-threaded segment engaged in the second orifice of the toothed wheel portion.

13. The assembly according to claim 8, wherein the at least one shear is staggered with the at least one retention screw.

14. A propeller for a turbine engine of an aircraft, the propeller comprising a plurality of assemblies according to claim 1.

15. The assembly according to claim 6, wherein the annular groove has a diameter smaller than a diameter of the first body.

16. The assembly according to claim 1, wherein the toothed wheel portion comprises first toothings configured to gear with second toothings of the counterweight device.

17. An assembly for a propeller of a turbine engine of an aircraft, the assembly comprising:
   a variable-pitch vane having a blade connected to a root, the vane having a longitudinal axis coincident with a pitch axis of the vane which passes through the root;
   a base secured in rotation to the vane about the pitch axis and connected to a toothed wheel portion extending about the pitch axis; and
   a counterweight device having a shaft movable in rotation about a substantially concurrent axis perpendicular to the pitch axis, the shaft being connected to at least one weigh and to a pinion portion geared with the toothed wheel portion,
   wherein the toothed wheel portion is attached to the base by at least one shear bolt, and
   wherein the assembly further comprising at least one retention screw for retaining the toothed wheel portion on the base, the at least one retention screw being non-functional as long as the at least one shear bolt is unbroken and the at least one retention screw being functional when the at least one shear bolt is broken.

* * * * *